(12) United States Patent
Yoshioka et al.

(10) Patent No.: US 7,077,779 B2
(45) Date of Patent: Jul. 18, 2006

(54) SOLENOID ACTUATED VARIABLE PRESSURE RELIEF VALVE ASSEMBLY FOR TORQUE TRANSFER ASSEMBLY

(75) Inventors: Jun Yoshioka, Waterville, OH (US); John A. Grogg, LaOtto, IN (US); Jeremy J. Wudy, Fort Wayne, IN (US); Martin Kaplan, Avon, CT (US)

(73) Assignee: Torque-Traction Technologies, Inc., Maumee, OH (US)

( * ) Notice: Subject to any disclaimer, the term of this patent is extended or adjusted under 35 U.S.C. 154(b) by 31 days.

(21) Appl. No.: 10/687,710

(22) Filed: Oct. 20, 2003

(65) Prior Publication Data

US 2005/0026733 A1    Feb. 3, 2005

Related U.S. Application Data

(63) Continuation-in-part of application No. 10/083,138, filed on Feb. 27, 2002, now Pat. No. 6,692,396.

(51) Int. Cl.
*F16H 48/30* (2006.01)
*F16H 47/08* (2006.01)
*F16H 48/06* (2006.01)
*F16H 48/20* (2006.01)
*F16H 48/22* (2006.01)

(52) U.S. Cl. ............ 475/231; 475/239; 475/150; 475/99; 475/108

(58) Field of Classification Search .......... 475/231, 475/239, 84, 150, 153, 89–90, 93, 99–101, 475/108
See application file for complete search history.

(56) References Cited

U.S. PATENT DOCUMENTS

| | | | |
|---|---|---|---|
| 2,730,184 A * | 1/1956 | Peterson | 180/54.1 |
| 4,860,208 A | 8/1989 | Bantle | |
| 4,989,686 A | 2/1991 | Miller et al. | |
| 5,002,147 A | 3/1991 | Tezuka et al. | |
| 5,197,566 A | 3/1993 | Watanabe et al. | |
| 5,259,476 A | 11/1993 | Matsuno et al. | |
| 5,297,994 A * | 3/1994 | Suzuki et al. | 464/27 |
| 5,964,126 A * | 10/1999 | Okcuoglu | 74/650 |
| 6,059,680 A * | 5/2000 | Yoshioka | 475/88 |
| 6,210,299 B1 * | 4/2001 | Yoshioka | 475/230 |
| 6,487,486 B1 | 11/2002 | Anderson | |
| 6,598,946 B1 | 7/2003 | Nagae | |
| 6,733,411 B1 * | 5/2004 | Kaplan et al. | 475/88 |
| 6,770,005 B1 * | 8/2004 | Aikawa et al. | 475/5 |
| 2001/0027905 A1 * | 10/2001 | Taureg | 192/35 |
| 2005/0037885 A1 | 2/2005 | Schrand | |

* cited by examiner

Primary Examiner—Tisha Lewis
(74) Attorney, Agent, or Firm—Berenato, White & Stavish

(57) ABSTRACT

A torque transfer assembly for a motor vehicle comprises a ring gear subassembly and a differential subassembly rotatably supported in said ring gear subassembly, a friction clutch pack for coupling the ring gear subassembly to the differential subassembly, and a hydraulic clutch actuator for selectively frictionally loading the clutch pack. The hydraulic clutch actuator includes a variable pressure relief valve assembly to selectively control the friction clutch pack. The variable pressure relief valve assembly includes a valve closure member, a valve seat complementary to the valve closure member, and a electro-magnetic actuator for engaging the valve closure member and urging thereof against the valve seat with an axial force determined by a magnitude of an electric current supplied to the electro-magnetic actuator so as to selectively vary a release pressure of the pressure relief valve assembly based on the magnitude of the electric current.

25 Claims, 5 Drawing Sheets

SOLENOID ACTUATED VARIABLE PRESSURE RELIEF VALVE ASSEMBLY FOR TORQUE TRANSFER ASSEMBLY

This application is a Continuation-In-Part of U.S. patent application Ser. No. 10/083,138 filed Feb. 27, 2002 now U.S. Pat. No. 6,692,396.

BACKGROUND OF THE INVENTION

1. Field of the Invention

The present invention relates to torque transfer assemblies for motor vehicles, and more particularly to a torque transfer assembly having an electronically controlled hydraulic actuator including an electromagnet actuated variable pressure relief valve.

2. Description of the Prior Art

Torque applied to a tire through a drive shaft propels a vehicle by the friction between the tire and the surface of the road for the vehicle. Occasionally, slip takes place between the road surface and the tire. The ratio of the slip depends on the coefficient of friction between the tire and the road surface. The coefficient of friction fluctuates due to the states of the road surface and the tire, the grounding load upon the tire, the magnitude of the torque transmitted to the tire, the driving speed of the vehicle, and so forth.

As for an ordinary two-wheel-drive vehicle, high torque is transmitted to each driving wheel through a transmission at the start of the vehicle so that a large slip could take place between the road surface and the tire of the wheel. The torque transmitted through the transmission decreases as the driving speed of the vehicle rises, so that the ratio of the slip falls.

When the torque transmitted to the tire is so high that the tire slips, the torque does not fully act to propel the vehicle, resulting in wasted motive power, lowered fuel efficiency, and adverse vehicle handling.

When the fluctuation in the coefficient of friction is large or the coefficient of friction is very small, as on a muddy road, a partially icy road, a snowy road, a graveled road, or the like, the stability of movement of the vehicle is reduced and the stopping distance increases in the case of locking of the wheel in braking. Moreover, it is sometimes difficult to maintain the direction of movement of the vehicle in the case of locking of the rear wheel (in particular, in braking).

For the above-mentioned reasons, four-wheel-drive vehicles have become popular vehicles for driving on a wide range of road conditions. In four-wheel-drive vehicles, the driving power of an engine is dividedly transmitted to four wheels to eliminate the above-mentioned drawbacks and problems.

Since a rotation speed difference arises between the front and rear wheels of the four-wheel-drive vehicle due to the turning radius difference between the front and the rear wheels at the time of turning of the vehicle, torsional torque is caused (a tight corner braking phenomenon) between the drive shafts for the front and the rear wheels if the turning is performed on a high-friction-coefficient road (such as a paved road), on which the driving wheel and the surface of the road are less likely to slip relative to each other. For that reason, different types of four-wheel-drive vehicles have been developed in order to prevent the deterioration of the moving property of each vehicle due to the torsional torque, the increase in the wear of the tire, the shortening of the life of the vehicle, and so forth.

One of the different types of four-wheel-drive vehicles is a part time four-wheel-drive vehicle in which the driver shifts from the four-wheel drive mode to the two-wheel drive mode when running on a high-friction-coefficient road such as a paved road. Another type of four-wheel-drive vehicle is a full time-four-wheel-drive or all-wheel-drive vehicle equipped with a center differential unit for dividedly transmitting motive power to a front and a rear wheel drive shafts. Another type of four-wheel-drive vehicle is a full time-four-wheel-drive vehicle in which the front or rear wheels are always driven and in which the rear or front wheels are driven through a viscous clutch which transmits torque by the viscosity of silicone oil or the like.

Although the part time-four-wheel-drive vehicle can be manufactured at a relatively low cost, it is troublesome to shift between the two-wheel drive and the four-wheel drive and it is likely that the vehicle is slowly turned when the driver mistakenly fails to properly choose between four-wheel drive and two-wheel drive. It is less likely that every driver can precisely predict the occurrence of slip of the driving wheel and take appropriate action.

Full time-four-wheel-drive vehicle, that are equipped with the center differential unit, have a front wheel drive differential unit, which dividedly transmits motive power to the right and left front wheels, and a rear wheel drive differential unit, which dividedly transmits motive power to the right and left rear wheels. These full-time four-wheel-drive vehicles suffer from a problem that no motive power is transmitted to any of the remaining three of four driving wheels when one wheel is caused to spin or loses the tire grip due to overhanging on the road side or ditch, a slip on an icy road, or the like. For that reason, the center differential unit is provided with a differential locking mechanism. The differential locking mechanism is of the mechanical type or the electronic control type. In the mechanical type, a differential rotation which takes place in the center differential unit is stopped through manual shifting when no motive power is transmitted to the three of the four driving wheels in order to put the vehicle into the state of direct-connection four-wheel drive. In the electronic control type, the speed of the vehicle, the angle of turning of the vehicle, the racing of the drive shaft, and so forth are detected by sensors in order to put the differential locking mechanism into a locking or unlocking state through an electronic controller. As for the mechanical type, it is difficult to set a differential locking start time point, the time point cannot be changed depending on the moving condition of the vehicle, and it is more difficult to automate the differential locking mechanism. As for the electronic control type, a device for controlling the differential locking mechanism is more complex and the cost of production of the mechanism is very high.

Since the center differential unit comprises an input shaft which receives motive power transmitted from an engine through a transmission, a differential case connected to the input shaft, a pinion shaft which is driven by the differential case, pinions rotatably attached to the peripheral surface of the pinion shaft, a first side gear which is engaged with the pinion and connected to a first differential means for driving the front or rear wheels, a second side gear which is engaged with the pinion and connected to a second differential means for driving the rear or front wheels, and the differential locking mechanism which engages the differential case and the side gear with each other through mechanical operation or electronic control, the cost of production of the center differential unit is very high and the weight of the vehicle is increased.

It is also known to replace the aforementioned center differential with a torque transmission coupling that includes an input shaft drivingly connected to the transmission and a first differential, an output shaft drivingly connected to a second differential, an oil pump driven by the relative rotation between the input and the output shafts to generate oil pressure corresponding to the speed of the relative rotation, and a friction clutch mechanism engaging the input shaft and the output shaft with each other by the oil pressure generated by the oil pump. The torque transmitted by the torque coupling is proportional to the speed of the relative rotation. When the rotation speed of the wheels driven by the first differential is higher than that of the wheels driven by the second differential, a rotation speed difference takes place between the input and the output shafts. The oil pump generates the oil pressure corresponding to that rotation speed difference. The oil pressure is applied to the friction clutch mechanism so that torque is transmitted from the input shaft to the output shaft depending on the magnitude of the oil pressure. When torque is transmitted to the second differential, the rotation speed of the wheels drivingly connected to the second differential is raised to approach that of the wheels driven by the first differential, thereby reducing the rotation speed difference between the input and the output shafts. In short, the torque transmission coupling operates in response to the rotation speed difference that takes place depending on the environmental situation of the vehicle and the moving conditions thereof. In other words, a prescribed slip is always allowed.

The conventional torque coupling assemblies, however, suffer from drawbacks inherent in their assembly and location within the vehicle drivetrain. Conventional torque coupling assemblies are installed in the transfer case or in-line with the driveline or driveshaft.

The need therefore exists for a torque coupling assembly that eliminates the need for a center differential in the transfer case, i.e. an interaxle differential, thereby reducing the driveline complexity and cost without requiring a separate torque coupling in the transfer case or in-line with the driveline.

Recent advances in vehicle control may require the disabling of the limited slip feature of the torque transfer device at moderate to high speeds. There is a need to disable the limited slip feature of the hydraulic torque transfer coupling assembly during specified conditions to ensure proper performance of the devices like yaw stability control while also allowing the limited slip feature to be enabled at other specified conditions where traction may be needed.

The need exists for an external control of the hydraulic pressure generated within an hydraulically actuated torque transfer devices in which torque transfer can either be turned on or off, or set at any intermediate condition by controlling the maximum system hydraulic pressure limit.

SUMMARY OF THE INVENTION

The present invention provides an improved electronically controlled torque transfer assembly. Accordingly, the present invention provides a four-wheel-drive vehicle which does not have the above-described drawbacks and problems but which fulfills the functions of four-wheel drive under all conditions and whose constitution and cost are simple and low, respectively.

The present invention provides an axle case assembly with a speed sensitive mechanism used to transmit torque from the ring gear to a planetary differential housing. The inventive differential assembly provides torque transfer proportional to the speed difference between the ring gear sub-assembly and a planetary gear set sub-assembly, wherein the invention splits a ring gear/differential case assembly into two primary pieces and a speed sensitive mechanism is installed between each piece. In the preferred embodiment, the torque transfer mechanism is entirely contained inside an axle differential assembly. An optional limited slip device may be provided for the differential gears.

The torque transfer assembly includes a friction disk clutch pack disposed within case and provided to selectively lock the torque transfer assembly. The torque transfer assembly further includes a hydraulic clutch actuator for selectively frictionally loading the clutch pack. The hydraulic clutch actuator comprises a hydraulic pump for generating a hydraulic pressure, a piston assembly between the pump and the clutch pack and defining a pressure chamber, and a variable pressure relief valve assembly to selectively control said torque transfer assembly. The variable pressure relief valve assembly has a pressure relief valve and a solenoid actuator for selectively setting a maximum hydraulic pressure attainable within the pressure chamber between a maximum release pressure when the friction clutch pack is in the fully "ON" condition, and a minimum release pressure when the friction clutch pack is in the fully "OFF" condition.

The variable pressure relief valve assembly includes a valve closure member, a valve seat complementary to the valve closure member, and an electro-magnetic actuator for engaging the valve closure member and urging thereof against the valve seat with an axial force determined by a magnitude of an electric current supplied to the electromagnetic actuator so as to selectively vary a release pressure of the pressure relief valve assembly based on the magnitude of the electric current.

Therefore, the torque transfer assembly in accordance with the present invention allows to dynamically control the hydraulic pressure of the hydraulic clutch actuator for selectively frictionally loading the clutch pack.

The primary features, structures and objectives of the invention will be more fully understood with reference to the following description and drawings.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

Figure 1:
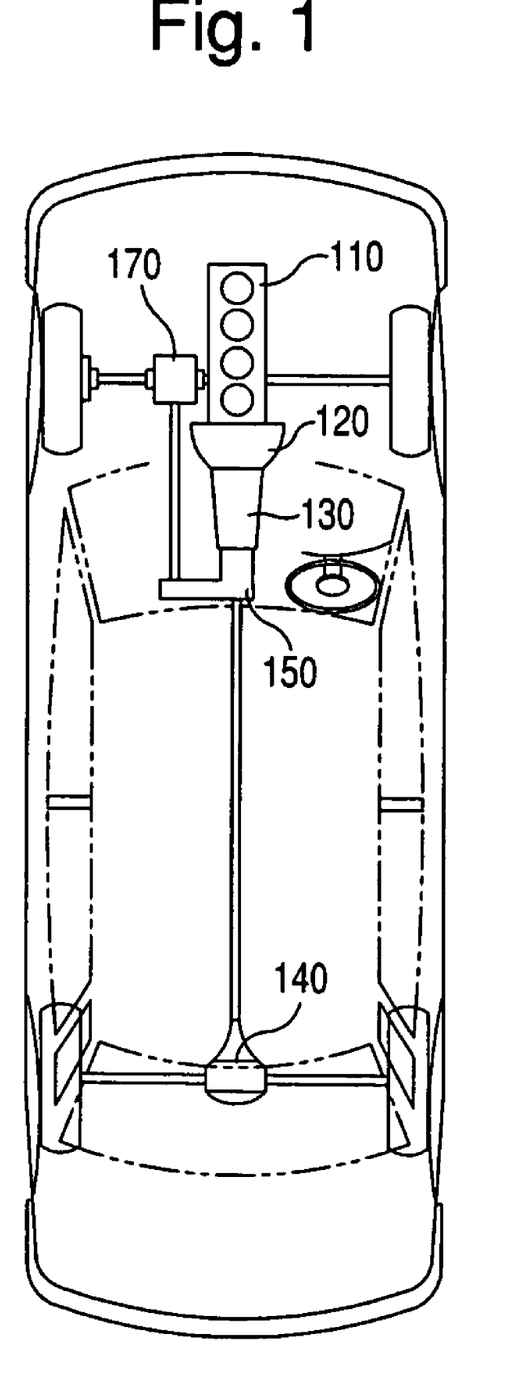
FIG. 1 is a schematic diagram showing a rear axle assembly of a motor vehicle including an electronically controlled torque transfer assembly.

With reference to FIG. 1, the four-wheel-drive vehicle provided in accordance with the present invention comprises an engine 110, a transmission 130 which is driven through a clutch 120 by the engine 110 to change the speed of the output rotation of the engine 110. A transfer case 150 divides torque transmission between a first differential assembly 140 that drives one of a front and a rear wheel systems and a second differential assembly 170 that drives the other of the front and the rear wheel systems.

In accordance with this invention, a torque transmission coupling is provided between a ring gear and a planetary differential housing of one of the first and second differential assemblies 140, 170. The torque transmission coupling comprises an oil pump that is driven by the relative rotation between the ring gear sub-assembly and a planetary gear set sub-assembly to generate oil pressure corresponding to the speed of the relative rotation. A friction clutch mechanism engages the ring gear sub-assembly and the differential gear set sub-assembly with each other by the oil pressure generated by the oil pump. The torque transmission coupling has such a property that the torque transmitted by the coupling is proportional to the speed of the relative rotation.

Figure 2:
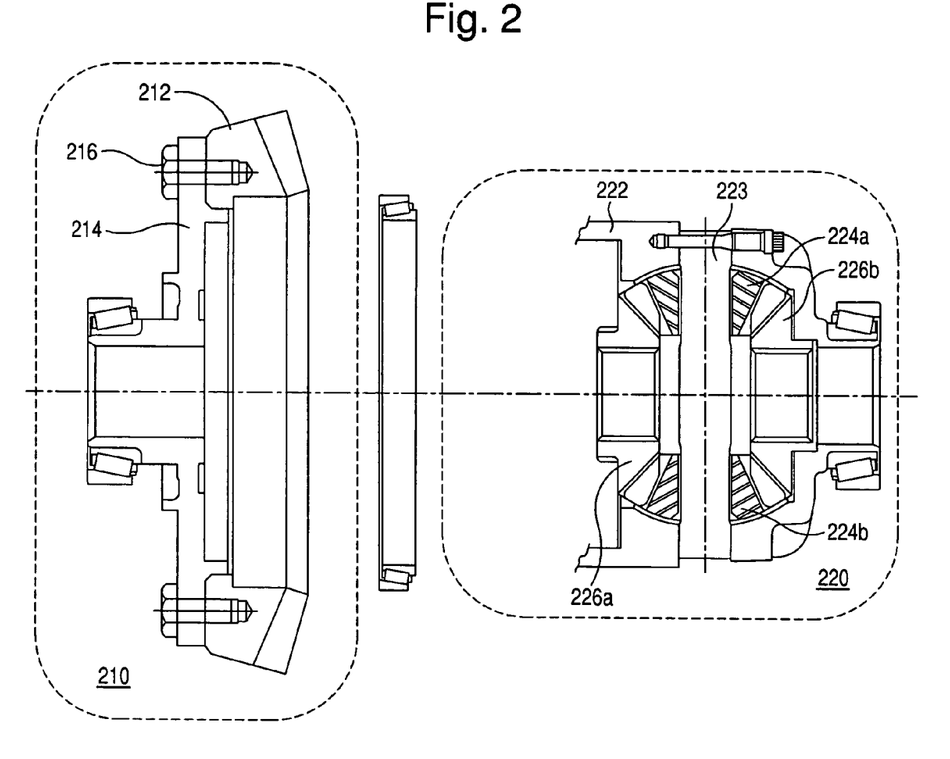
FIG. 2 is an exploded schematic view of the torque transfer assembly of this invention disposed between a ring gear sub-assembly and a differential sub-assembly.

With reference to FIG. 2, the torque coupling assembly comprises a ring gear outer sub-assembly 210 and a differential sub-assembly 220. The ring gear outer sub-assembly 210 includes a ring gear 212 fastened to an outer case member 214 via fasteners 216 or other conventional fastening system known to those of skill in the art. The differential sub-assembly 220 comprises a differential case 222, a pinion shaft 223 driven by the rear differential case 222, pinions 224a, 224b rotatably attached to the shaft 223, and side gears 226a, 226b engaged with the pinions 224. The side gears 226a, 226b drive the right and left axles (not shown in FIG. 2).

Figure 3:
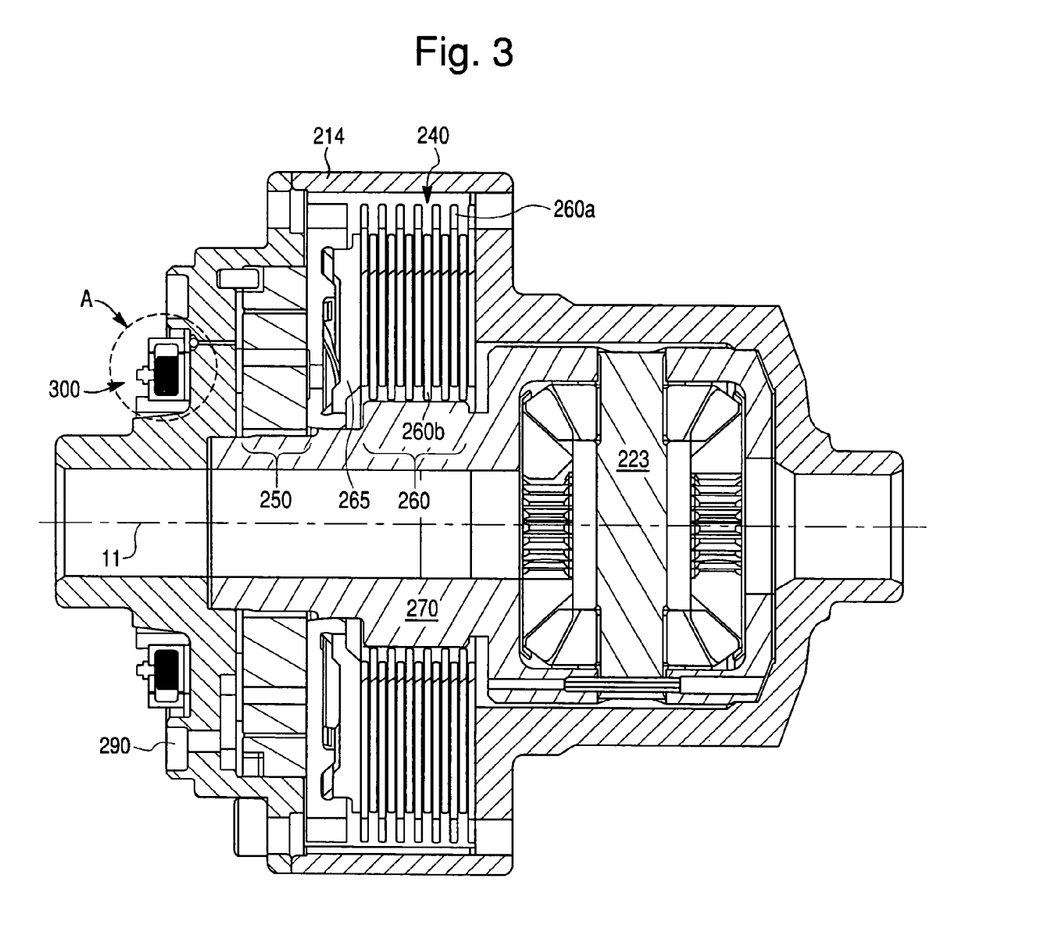
FIG. 3 is a sectional view of the electronically controlled limited slip differential assembly in accordance with the present invention.

With reference to FIG. 3, a speed-sensitive torque coupling assembly (shown generally as 240) is provided between the ring gear sub-assembly 210 and the differential sub-assembly 220. The speed-sensitive torque coupling assembly 240 included in the preferred embodiment of the present invention comprises a fluid pump 250 and a clutch pack 260. The fluid pump shown and described herein is a Gerotor type pump of the automatically reversible unidirectional flow type. The specific structure of the fluid pump 250 and clutch pack 260 will be described below.

The friction clutch pack 260 includes sets of alternating outer friction plates 260a and inner friction plates 260b. Conventionally, an outer circumference of the outer friction plates 260a is provided with projections that non-rotatably engages corresponding grooves formed in the outer case member 214. Similarly, an inner circumference of the inner friction plates 260b is provided with projections that non-rotatably engage corresponding grooves formed in the clutch sleeve 270, which in turn is integrally formed with or splined to the differential case 222. At the same time, both the outer friction plates 260a and the inner friction plates 260b are slideable in the axial direction. The clutch plates 260a frictionally engage the clutch plates 260b to form a torque coupling arrangement between the outer case member 214 and the differential case 222 housing the differential mechanism; e.g., pinion gears and side gears. Torque is transferred from the outer case 214 to the differential case 222, which drives the differential mechanism.

The clutch pack 240 is selectively actuated by a hydraulic clutch actuator including the speed sensitive hydraulic displacement pump 250, and a piston assembly for axially loading the clutch pack 260.

The speed sensitive hydraulic displacement pump 250 disposed between the outer case member 214 and the differential case 222 actuates the clutch pack 260 when the relative rotation between these components 214, 222 occurs. It will be appreciated that a hydraulic pressure generated by the pump 250 is substantially proportional to a rotational speed difference between the outer case member 214 and the differential case 222. Preferably, the hydraulic displacement pump 250 employed to provide pressurized hydraulic fluid to actuate the clutch pack 260 is a gerotor pump. The gerotor pump 250 includes an outer ring member, an outer rotor, and an inner rotor. The inner rotor is drivingly coupled to the clutch sleeve 270, and the outer ring member is secured to the outer case member 214. The inner rotor has one less tooth than the outer rotor and, when the inner rotor is driven, it will drive the outer rotor, which can freely rotate within the outer ring member eccentrically with respect to the inner rotor, thus providing a series of decreasing and increasing volume fluid pockets by means of which fluid pressure is created. Therefore, when relative motion takes place between outer case member 214 and the differential case 222, the inner rotor of the gerotor pump 250 generates hydraulic fluid pressure. However, it will be appreciated that any other appropriate type of hydraulic pump generating the hydraulic pressure in response to the relative rotation between the outer case member 214 and the differential case 222 is within the scope of the present invention.

The piston assembly includes a hydraulically actuated piston 255 which serves to compress the clutch pack 260 and retard any speed differential between the outer case member 214 and the differential case 222. This results in a retardation of any speed differential between the front axle and rear axle. Pressurized hydraulic fluid to actuate the piston 255 and engage the clutch pack 260 is provided by the gerotor pump 250. In such an arrangement, when a speed difference exists, the hydraulic fluid is drawn into the pump 250 through a suction passage 290. The gerotor pump 250 pumps the pressurized fluid into a piston pressure chamber defined between the piston 255 and the piston housing to actuate the clutch pack 260. As the speed difference increases, the pressure increases. The pressurized fluid in the piston pressure chamber creates an axial force upon the piston 255 for loading the clutch pack 260, which is further resisted by the friction plates 260a and 260b. The loading of the clutch pack 260 allows for a torque transfer distribution between the outer case member 214 and the differential case 222.

With the assembly of FIGS. 2 and 3, a torque coupling assembly is provided within the axle differential case assembly. Therefore, when the rotation speed of the wheels driven by the first differential 140 is higher than that of the wheels driven by the second differential 170, a rotation speed difference takes place. In that case, the pump 250 generates the oil pressure corresponding to that rotation speed difference. The oil pressure is applied to the friction clutch mechanism 260 so that torque is properly distributed between the first differential 140 and the second differential 170 depending on the magnitude of the oil pressure. When the torque is transmitted to the second differential 170, the rotation speed of the wheels drivingly connected to the second differential 170 is raised to approach that of the wheels driven by the first differential 140, thereby reducing the rotation speed difference between the front and rear wheels.

In the low speed running of the vehicle, the absolute value of the speed of rotation transmitted to the first differential 140 is small, and the rotation speed of the ring gear sub-assembly 210 is therefore small as well. Even if the speed of the rotation of the differential sub-assembly 220 output shaft is zero or very low, the absolute value of the rotation speed difference between the sub-assemblies 210, 220 is small. In addition, the rising of the oil pressure generated by the oil pump at the low rotation speed is generally slow due to the internal leak of the pump. For these reasons, the torque transmitted through the friction clutch mechanism 260 is very low, so that the ring gear sub-assembly and the differential sub-assembly are allowed to slip relative to each other. As a result, torsional torque caused between a front and a rear wheel drive shafts at the time of slow turning of the vehicle is absorbed by the friction clutch mechanism 260 to prevent a tight corner braking phenomenon.

In the high speed running of the vehicle, if the rotation speed of the wheels driven by the second differential 170 is even slightly lower than that of the wheels driven by the first differential 140, the absolute value of the rotation speed difference between the ring gear sub-assembly 210 and the differential sub-assembly is certain to increase, because the absolute value of the speed of rotation transmitted to the first differential 140 is large in proportion to the driving speed of the vehicle. Therefore, the torque transmitted through the friction clutch mechanism 260 is also high, corresponding to the absolute value of the rotation speed difference between the ring gear sub-assembly 210 and the differential sub-assembly 220 shafts so that these shafts are maintained in a torque transmission state approximate to a directly connected state. For that reason, in the rapid running of the vehicle, the torque of the engine is transmitted to the front and the rear wheels, while the torque is divided nearly at a ratio of 50:50 between them, so that the stability of the running of the vehicle and the fuel efficiency thereof are enhanced.

Since the second differential 170 is always connected to the first differential 140 through the torque transmission coupling 240, it is not necessary to perform troublesome shifting between two-wheel drive and four-wheel drive as is done in the conventional part time-four-wheel-drive vehicle.

When some driving wheel slips during the running of the vehicle provided in accordance with the present invention, the rotation speed difference between the ring gear sub-assembly 210 and differential sub-assembly 220 of the torque transmission coupling increases immediately so that the oil pressure corresponding to the rotation speed difference increases. Consequently, the friction clutch mechanism 260 immediately acts to prevent the increase in the rotation speed difference between the ring gear sub-assembly 210 and the differential sub-assembly 220 to keep the slipping driving wheel from skidding sideways. Excess torque is transmitted to the other non-slipping driving wheels instead of the slipping driving wheel, so that the torque of the engine transmitted through the transmission is dividedly transmitted to the first and the second differentials 140, 170. Appropriate driving forces are thus automatically and constantly applied to the front and the rear driving wheels with good response.

A variable pressure relief valve assembly 300 is provided for selectively controlling a discharge pressure of the pump 250 and, subsequently, the clutch pack 260. The variable pressure relief valve assembly 300 is operated by an electro-magnetic (preferably, solenoid) actuator, electronically controlled by a differential control module (DCM) based on one or more vehicle parameters as control inputs, such as a vehicle speed, a wheel speed difference, vehicle yaw rate, a vehicle lateral acceleration, a steering angle, an engine throttle position, a brake application, an ice detection, a moisture detection, a vehicle driveline configuration and a yaw stability control system actuation, and a programmable control mechanism could be used to interface with the hydraulic actuated limited slip differential. The DCM is also connected to a source of an electric power supply, such as an electric storage battery mounted on the motor vehicle.

When energized, solenoid-operated valve assembly 300 is capable of modulating a pump discharge pressure in a variable range from a minimum pressure to a maximum pressure, thereby variably controlling a drive torque distribution between the outer case member 214 and the differential case in a range from a minimum torque value to a maximum torque value. For example, the variable pressure relief valve assembly 300 may be actuated to disengage the limited slip feature of the clutch pack 260 when relative rotation exceeds a predetermined level. When the relative rotation falls below the predetermined level, the limited slip feature can be turned back "ON".

Figure 4:
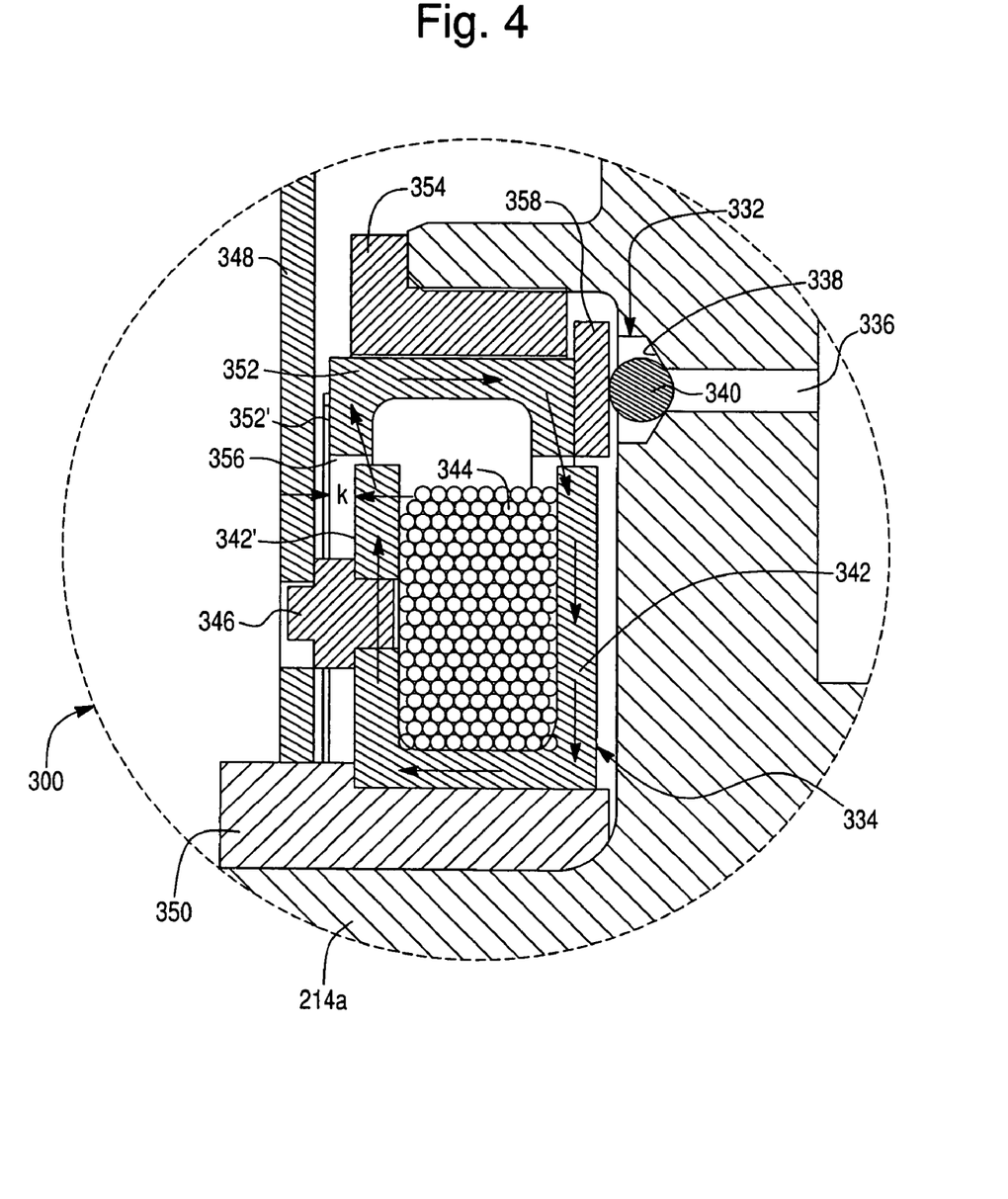
FIG. 4 is an enlarged partial sectional view of a variable pressure relief valve assembly shown in a circle 'A' in FIG. 3.

The variable pressure relief valve assembly 300 according to the present invention, illustrated in detail in FIG. 4, is in the form of an electro-magnetic valve assembly and comprises a pressure relief check valve 332 controlled by an electro-magnetic actuator 334 that may be any appropriate electro-magnetic device well known in the art, such as solenoid.

The check valve 332 comprises a fluid relief passageway 336 that is in fluid communication with the piston pressure chamber, a substantially conical valve seat 338 that is in open communication with the passageway 336, and a spherical valve closure member 340 adapted to seat in the valve seat 338 for sealing the fluid relief passageway 336. It will be appreciated that the valve closure member 340 may be in any appropriate form other than spherical, such as conical. The valve seat 338 is formed in the side wall 214a of the outer case member 214. The valve closure member 340 is movable between a closed position when the valve closure member 340 engages the valve seat 338 (as shown in FIG. 4), and an open position when the valve closure member 340 is axially spaced from the valve seat 338.

The electro-magnetic actuator 334 comprises a substantially annular coil housing 342, a coil winding 344 wound about the coil housing 342, and a substantially annular armature 352 axially movable in the direction of the rotational axis 11. The armature 352 is coaxial to the coil winding 344 and is radially spaced from the coil housing 342, thus defining an air gap 356. The coil housing 342 is supported by the outer case member 214 substantially coaxially to the axis II through a coil housing bushing 350 for rotation relative to the outer case member 214. At the same time, the coil housing 342 is non-rotatable relative to an axle housing (not shown). The coil housing 342 is preferably formed of a single-piece magnetically permeable material, such as conventional ferromagnetic materials. Alternatively, the coil housing 342 may be formed of a plurality of laminations of the magnetically permeable material. The coil housing bushing 350 is made of any appropriate non-magnetic material well known to those skilled in the art. In order to non-rotatably secure the coil housing 342 to the axle housing (not shown), an anti-rotation pin 346 is employed for non-rotatably coupling the coil housing 342 to an anti-rotation plate 348 fixed to the axle housing (not shown). Alternatively, the coil housing 342 may be non-rotatably mounted to the outer case member 214.

The annular armature 352 is supported within an armature bushing 354 for axially movement in the direction of the axis 11. The armature bushing 354 is non-rotatably mounted to the side member 214a of the outer case member 214 by any appropriate means, such as press-fitting, adhesive bonding, etc. Preferably, the armature bushing 354 is made of any appropriate non-magnetic material well known to those skilled in the art.

In the exemplary embodiment illustrated in FIGS. 3 and 4, the armature 352 is disposed outside the coil winding 344 of the electro-magnetic actuator 334. Alternatively, the armature 352 may be disposed within the coil winding 344.

The valve closure member 340 is urged and held in place by against the valve seat 338 by an actuator plate 358. In turn, the actuator plate 358 is adapted to engage the armature 352 of the electro-magnetic actuator 334 disposed outside the coil winding 344 thereof. Preferably, the actuator plate 358 is in the shape of an annular segment of approximately 15° and is made of any appropriate non-magnetic material well known to those skilled in the art. Furthermore, the actuator plate 358 is fastened to the armature 352 by any appropriate means known in the art, such as threaded connectors, adhesive bonding, etc.

When electrical current is supplied to the coil winding 344, a magnetic flux is caused to flow through the armature 352. The magnetic flux creates an axial force that axially displaces the armature 352 relative to the coil winding 344. The armature 352 moves the actuator plate 358, which, in turn, urges the valve member 340 upon the valve seat 338 with a predetermined axial retaining force that is a function of the electrical current supplied to the coil winding 344. It will be appreciated by those skilled in the art that the pressurized hydraulic fluid will not flow through the pressure relief valve 332 until the hydraulic pressure generated by the gerotor pump 326 results in a reaction force larger than the axial retaining force exerted to the armature 352 by the magnetic flux generated by the coil winding 344, thereby pushing the valve closure member 340 out of the valve seat 338. Therefore, such an arrangement creates a relief valve with a release pressure that is a function of the current supplied to the coil winding 344, and provides a predetermined pressure limit in the hydraulic system. Thus, the variable pressure relief valve assembly 330 selectively sets the release pressure of the pressure relief valve 332 based on the magnitude of the electrical current supplied to the coil winding 344 and, subsequently, defines the magnitude of the pressure within the piston pressure chamber.

When a maximum current is applied to the coil winding 344 of the solenoid actuator 334, the retaining force of the pressure relief valve 332 is at its maximum, thus a maximum release pressure is provided by the pressure relief check valve 332. In this configuration, the maximum pressure attainable within the outer case member 214 is sufficient to fully actuate the hydraulic clutch pack 260 which results in providing the limited slip function in the torque transfer assembly 10, and the limited slip feature is in the fully "ON" condition.

The pressure limit of the pressure relief valve 332, i.e. the release pressure of the pressure relief valve 332, can be adjusted by controlling the current applied to the coil winding 344 of the electro-magnetic actuator 334.

As less current is applied to the coil winding 344, less axial retaining force is exerted to the relief valve 332, thus the less is the release pressure provided by the relief valve 332. This results in an adjustment mechanism for lowering the maximum system pressure attainable within the outer case member 12.

When a minimum current is applied to the coil winding 344 of the solenoid actuator 334, the retaining force of the pressure relief valve 332 is at its minimum, thus a minimum release pressure is provided by the relief valve 332. In this configuration, the limited slip feature is in the fully "OFF" condition in that the maximum pressure which can be obtained in the outer case member 214 is not high enough to engage the clutch pack 260, essentially disabling the limited slip feature of the hydraulic torque transfer assembly without affecting the torque transfer capability.

In between the "ON" and "OFF" conditions of the torque transfer assembly the release pressure of the relief valve 332 may be set at any value by modulating the current applied to the coil winding 344 of the solenoid actuator 334. This provides the hydraulic torque transfer assembly 10 with a variable maximum pressure limit in which the amount of the limited slip available to the torque transfer assembly 10 can be limited and optimized to match various vehicle operating conditions. This provides an opportunity to dynamically control the hydraulic pressure for traction enhancement. For example, if the release pressure is set at a low value, a control system can be used to sense wheel speeds or speed differences and allow for increased hydraulic pressure. The increase in pressure available may be a function of the speed difference. This will result in an optimized amount of limited slip between the fully "ON" and "OFF" conditions.

It will be appreciated by those skilled in the art that the armature 352 may have any appropriate shape in the cross-section. Preferably, as illustrated in the exemplary embodiment of FIG. 4, the armature 352 has a generally U-shaped cross-section with magnetic poles facing the coil winding 344, similar to those used in reluctance electric motors. Moreover, the mutual geometric arrangement of the armature 352 and the coil housing 342 is such as to maintain a substantially constant axial force applied upon the valve closure member 340 by the electro-magnetic actuator 334 as it moves from its closed to open position. This is achieved by maintaining a proper "off-set" between the armature 352 and the coil housing 342 (and, consequently, the coil winding 342). The term "off-set" is determined here as an amount of misalignment between the armature 352 and the coil housing 342, or a distance 'k' between an outward face 342' of the coil housing 342 and an outward face 352' of the armature 352, as illustrated in FIG. 4.

Figure 5:
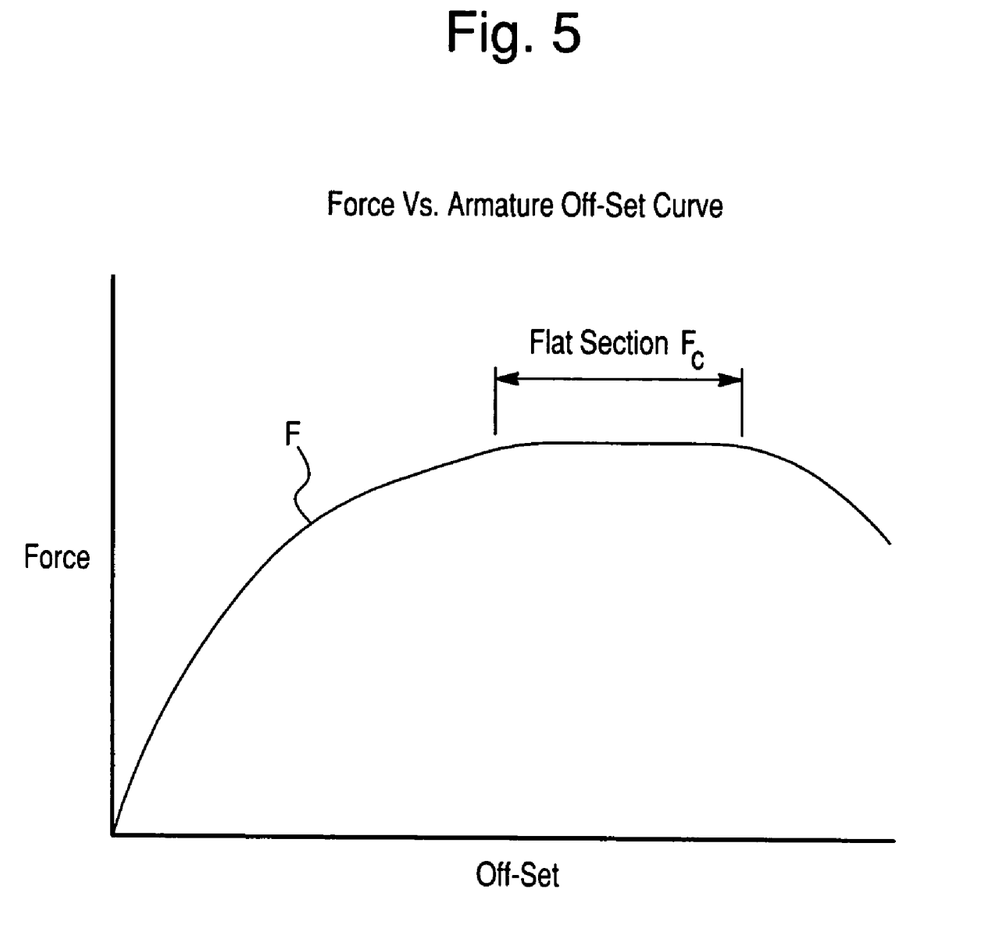
FIG. 5 is a graph showing an axial force applied upon a valve closure member by an electro-magnetic actuator as a function of "off-set" between a coil housing and an armature.

FIG. 4 depicts a graph showing the axial force applied upon the valve closure member 340 by the electro-magnetic actuator 334 as a function of the "off-set" distance 'k' while a constant magnitude of the electric current is supplied to the coil winding 344. The graph is in the form of a curved line 'F' having a substantially "flat" section '$F_c$' wherein the axial force varies insignificantly with respect to the "off-set" distance 'k'. However, operation outside of this section '$F_c$' results in an abrupt change of the axial force. Thus, while the electro-magnetic actuator 334 of the relief valve assembly 330 is operated in the "flat" section '$F_c$', the axial force applied upon the valve closure member 340 by the electro-magnetic actuator 334 is substantially constant as it moves from its closed to open position, and is a function of the electrical current supplied to the coil winding 344. On the other hand, operation outside of this "flat" section $F_c$ results in the axial force being a function of both the current and the "off-set" distance 'k' that would make control of the variable pressure relief valve much more difficult requiring a closed loop feedback as to the valve's "off-set". Other, more traditional solenoid pole designs do not provide this "flat" section in the axial force versus "off-set" distance curve.

For the above described reason, the electro-magnetic actuator 334 in accordance with the preferred embodiment of the present invention is arranged to provide the "off-set" distance 'k' between the coil housing 342 and the armature 352 within the "flat" section $F_c$ of the axial force versus "off-set" distance curve so as to ensure that the axial force applied upon the valve closure member 340 by the electromagnetic actuator 334 is substantially constant as it moves from its closed to open position, and is a function only of the electrical current supplied to the coil winding 344.

Therefore, the electronically controlled differential assembly in accordance with the present invention represents a novel arrangement of the limited slip differential assembly provided with an electro-magnetic actuator for activating a variable pressure relief valve for allowing both limited slip and open differential capabilities.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A torque transfer assembly in a motor vehicle, said torque transfer assembly comprising:
    a ring gear assembly adapted to deliver an input drive torque;
    a differential assembly adapted to receive said input drive torque, said differential assembly being rotatable relative to said ring gear assembly;
    at least one output shaft drivingly connected to said differential assembly through a differential gear mechanism;
    a friction clutch pack for selectively delivering said input drive torque from said ring gear assembly to said differential assembly, said clutch pack comprising at least one inner friction plate coupled to rotate with said differential assembly and at least one outer friction plate coupled to rotate with said ring gear assembly; and
    a hydraulic clutch actuator for selectively frictionally loading said clutch pack, said actuator comprising:
        a hydraulic pump for generating a hydraulic pressure to frictionally load said clutch pack; and
        a variable pressure relief valve assembly to selectively control said friction clutch pack, said variable pressure relief valve assembly including a valve closure member, a valve seat complementary to said valve closure member, and a electro-magnetic actuator for engaging said valve closure member and urging thereof against said valve seat so as to selectively vary a release pressure of said pressure relief valve assembly based on a magnitude of an electric current supplied to said electro-magnetic actuator,
    wherein said valve closure member is movable between a closed position when said valve closure member engages said valve seat and an open position when said valve closure member is axially spaced from said valve seat.

2. The torque transfer assembly as defined in claim 1, wherein said electro-magnetic actuator including a coil winding supported by said ring gear assembly and an armature radially spaced from said coil winding and axially movable relative thereto in response to a magnetic flux generated by said coil winding when said electrical current is supplied thereto, said armature engages said valve closure member and urges thereof against said valve seat with an axial force determined by said magnitude of said electric current for selectively setting up said release pressure of said valve closure member.

3. The torque transfer assembly as defined in claim 2, wherein said coil winding is coaxial to an axis of rotation of said ring gear assembly.

4. The torque transfer assembly as defined in claim 2, wherein said coil winding is rotatably supported by said ring gear assembly.

5. The torque transfer assembly as defined in claim 2, wherein said coil winding is substantially annular in shape and is mounted substantially coaxially to an axis of rotation of said ring gear assembly.

6. The torque transfer assembly as defined in claim 2, wherein said coil winding is wound about a coil housing rotatably mounted to an outer peripheral surface of said ring gear assembly.

7. The torque transfer assembly as defined in claim 6, wherein said coil housing is substantially annular in shape and is mounted substantially coaxially to an axis of rotation of said ring gear assembly.

8. The torque transfer assembly as defined in claim 2, wherein said armature is non-rotatably coupled to said ring gear assembly.

9. The torque transfer assembly as defined in claim 2, wherein said armature is disposed outside said coil winding of said electro-magnetic actuator.

10. The torque transfer assembly as defined in claim 2, wherein said armature is substantially annular in shape and is mounted substantially coaxially to an axis of rotation of said ring gear assembly.

11. The torque transfer assembly as defined in claim 1, wherein said friction clutch assembly is a friction clutch pack including a plurality of inner friction plates coupled to rotate with said differential assembly and a plurality of outer friction plate coupled to rotate with said ring gear assembly, said friction plates being frictionally engageable with one another.

12. The torque transfer assembly as defined in claim 1, wherein said hydraulic pump is disposed within a housing defined by said ring gear assembly and generates a hydraulic pressure in response to relative rotation between said ring gear assembly and said differential assembly.

13. The torque transfer assembly as defined in claim 12, wherein said pump is a gerotor pump.

14. The torque transfer assembly as defined in claim 1, wherein said variable pressure relief valve assembly is adapted to selectively set a maximum hydraulic pressure attainable within said ring gear assembly between a maximum release pressure and a minimum release pressure.

15. The torque transfer assembly as defined in claim 1, wherein said hydraulic clutch actuator further including a piston assembly disposed within said ring gear assembly between said pump and said clutch pack and defining a pressure chamber, wherein said variable pressure relief valve assembly selectively controls a maximum hydraulic pressure attainable within said pressure chamber.

16. The torque transfer assembly as defined in claim 15, wherein said variable pressure relief valve assembly selectively controls said maximum pressure attainable within said pressure chamber between a maximum release pressure and a minimum release pressure.

17. The torque transfer assembly as defined in claim 16, wherein said minimum release pressure is at a level that prevents actuation of said friction clutch pack.

18. The torque transfer assembly as defined in claim 16, wherein said maximum release pressure is at a level that enables complete actuation of said friction clutch pack.

19. The torque transfer assembly as defined in claim 16, wherein said maximum hydraulic pressure attainable within said pressure chamber is adjustable between said minimum release pressure and said maximum release pressure so as to enable partial actuation of said friction clutch pack.

20. The torque transfer assembly as defined in claim 1, wherein said variable pressure relief valve assembly is adapted to selectively set a maximum hydraulic pressure attainable within said ring gear assembly between a maximum and a minimum release pressure.

21. The torque transfer assembly as defined in claim 20, wherein said minimum release pressure is at a level that prevents actuation of said friction clutch pack.

22. The torque transfer assembly as defined in claim 20, wherein said maximum release pressure is at a level that enables complete actuation of said friction clutch pack.

23. The torque transfer assembly as defined in claim 20, wherein said maximum hydraulic pressure attainable within said ring gear assembly is adjustable between said minimum release pressure and said maximum release pressure so as to enable partial actuation of said friction clutch pack.

24. The torque transfer assembly as defined in claim 2, wherein said armature has a substantially U-shaped cross-section.

25. The torque transfer assembly as defined in claim 2, wherein said coil winding is wound about a coil housing rotatably mounted to said ring gear assembly and wherein said armature is off-set from said coil housing to a distance that ensures that said axial force applied upon said valve closure member by said electro-magnetic actuator is substantially constant as said valve closure member moves from said closed position to said open position and said axial force is a function only of said electrical current supplied to said coil winding.

* * * * *